US009733933B1

(12) United States Patent
Arquero et al.

(10) Patent No.: US 9,733,933 B1
(45) Date of Patent: Aug. 15, 2017

(54) AUTOMATIC COMMENT EDITING FOR A SMART INTEGRATED DEVELOPMENT ENVIRONMENT

(71) Applicant: INTERNATIONAL BUSINESS MACHINES CORPORATION, Armonk, NY (US)

(72) Inventors: Gregg M Arquero, Poughkeepsie, NY (US); Eli M. Dow, Wappingers Falls, NY (US); Syed F. Hossain, Hopewell Junction, NY (US); Joshua A. Schaeffer, White Plains, NY (US); Yunli Tang, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/269,105

(22) Filed: Sep. 19, 2016

(51) Int. Cl.
  *G06F 9/44* (2006.01)
  *G06F 17/22* (2006.01)
(52) U.S. Cl.
  CPC .............. *G06F 8/73* (2013.01); *G06F 8/33* (2013.01); *G06F 8/71* (2013.01); *G06F 17/2211* (2013.01)
(58) Field of Classification Search
  CPC ..... G06F 8/71; G06F 8/73; G06F 8/33; G06F 17/2211; G06F 15/18; G06F 8/77
  See application file for complete search history.

(56) References Cited

U.S. PATENT DOCUMENTS

| | | | |
|---|---|---|---|
| 5,805,889 A * | 9/1998 | Van De Vanter | G06F 8/71 707/E17.005 |
| 6,993,487 B2 | 1/2006 | Bluvband | |
| 7,392,469 B1 * | 6/2008 | Bailin | G06F 17/241 715/201 |
| 7,627,851 B2 | 12/2009 | Lotter | |
| 7,937,688 B2 | 5/2011 | Vaidyanathan et al. | |
| 8,365,148 B2 | 1/2013 | Millmore | |
| 8,418,130 B2 | 4/2013 | Tittizer et al. | |
| 8,433,687 B1 | 4/2013 | Pydi | |
| 9,274,756 B1 | 3/2016 | Clausen et al. | |
| 2004/0230952 A1 * | 11/2004 | Massaro | G06F 17/2211 717/120 |
| 2008/0178117 A1 * | 7/2008 | Gelman | G06F 3/0481 715/808 |
| 2012/0036492 A1 * | 2/2012 | Armstrong | G06F 8/30 717/100 |

(Continued)

*Primary Examiner* — Lewis A Bullock, Jr.
*Assistant Examiner* — Jacob Dascomb
(74) *Attorney, Agent, or Firm* — Cantor Colburn LLP; Steven Chiu (57) ABSTRACT

Disclosed herein are methods, systems, and computer program products for automatically identifying a comment change deficiency by a code editing component executed by a processor. The automatic identification of the comment changes includes determining whether one or more character changes exist between a first code version and a second code version and determining whether one or more logical changes exist between the first code version and the second code version. Note that the first code comment relates to the character or the logical changes within the first code version. Further, the automatic identification of the comment changes includes identifying the at least one comment related to the character or the logical changes and generating a notification including the at least one comment.

10 Claims, 5 Drawing Sheets

Process Flow 100

(56) References Cited

U.S. PATENT DOCUMENTS

| | | | |
|---|---|---|---|
| 2013/0185700 A1* | 7/2013 | Avrahami | G06F 8/73 717/120 |
| 2015/0046904 A1* | 2/2015 | Rummler | G06F 8/71 717/122 |
| 2015/0347128 A1 | 12/2015 | Frenkiel et al. | |

* cited by examiner

AUTOMATIC COMMENT EDITING FOR A SMART INTEGRATED DEVELOPMENT ENVIRONMENT

BACKGROUND

In general, editing older code in a code editor may alter blocks of that older code without giving appropriate attention to any surrounding comments. In some cases, these alterations may remove specific code blocks obviating respective comments entirely and/or may change how the older code functions thereby outdating existing comments. It is desirable ensure that, after editing the older code, comments of a resulting newer code are relevant.

SUMMARY

According to one embodiment, a method of automatically identifying a comment change deficiency by a code editing component executed by a processor is provided. The method comprises determining whether one or more character changes exist between a first code version and a second code version; determining whether one or more logical changes exist between the first code version and the second code version; identifying whether the comment change deficiency exists by locating and comparing a first code comment and a second code comment, wherein the first code comment relates to the character or the logical changes within the first code version; and generating one or more notifications identifying the comment change deficiency. The method can be implemented in a system and/or a computer program product.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

The disclosure relates generally to automatic comment editing of a smart integrated development environment (IDE), and more specifically, to a smart IDE that determines whether there are code changes between code versions, with respect to comment change deficiencies, and provides a notification when a recent code requires updating based on those deficiencies. For example, when a user or computer programmer updates a code and compiles it, the smart IDE can compare a latest version of the code with a previous version of the code. The compare operation can include tracking a change of characters in the code itself, along with comment changes associated with lines/blocks of the code, and/or smart parsing so that the code changes can be reconciled with the comment changes.

The smart IDE can be a code editing application comprising comprehensive facilities to a user (e.g., a computer programmer) for code development. The smart IDE comprises a comment editing sub-part that warns the user a code change occurs without an appropriate code comment adjustment that is commensurate with an editing level of the code change. The smart IDE may also comprise one or more of a source code editor, build automation tools, a debugger, intelligent code completion, a compiler, an interpreter, a class browser, an object browser, and a class hierarchy diagram. The comment editing sub-part can be a software component of the smart IDE or a smart plug-in for an existing computer program. The smart plug-in can be a stand-alone software component that adds features of the comment editing sub-part to the existing computer program.

The code being edited in the smart IDE can be any collection of computer instructions (possibly with comments), such as a source code of computer software and/or firmware. Versions of the code (i.e., code versions) are saved iterations of the code throughout development in the smart IDE. Each code version can have a timestamp and/or an ordinal identification to indicate when/where that code version occurs within the development. Code changes comprise alterations to the computer instructions and/or comments between code versions. Code changes can be determined by the code editing component between any code versions. Comment changes can be determined by the code editing component between similar comments across code versions.

Notifications, in general, are identifying information (or non-existence of the information) targeted to users or systems responsible for the code being edited in the smart IDE. Examples of notifications may include, but are not limited to, any combination of desktop alerts (e.g., dialog, balloon, modal window, toast, etc.), visual displays (e.g., display pop-ups, flashing lights), pager (e.g., SNPP), electronic mail (e.g., POP, IMAP, SMTP), instant messaging (e.g., IRC, ICQ, AIM, Yahoo! Messenger, MSN, XMPP, iMessage), text messaging (e.g., SMS), audio alerts (e.g., bu5ers, bells, tones, telephone calls, cellphone calls, VoIP calls, voicemails, loudspeaker announcements, etc.), and the like.

Figure 1:
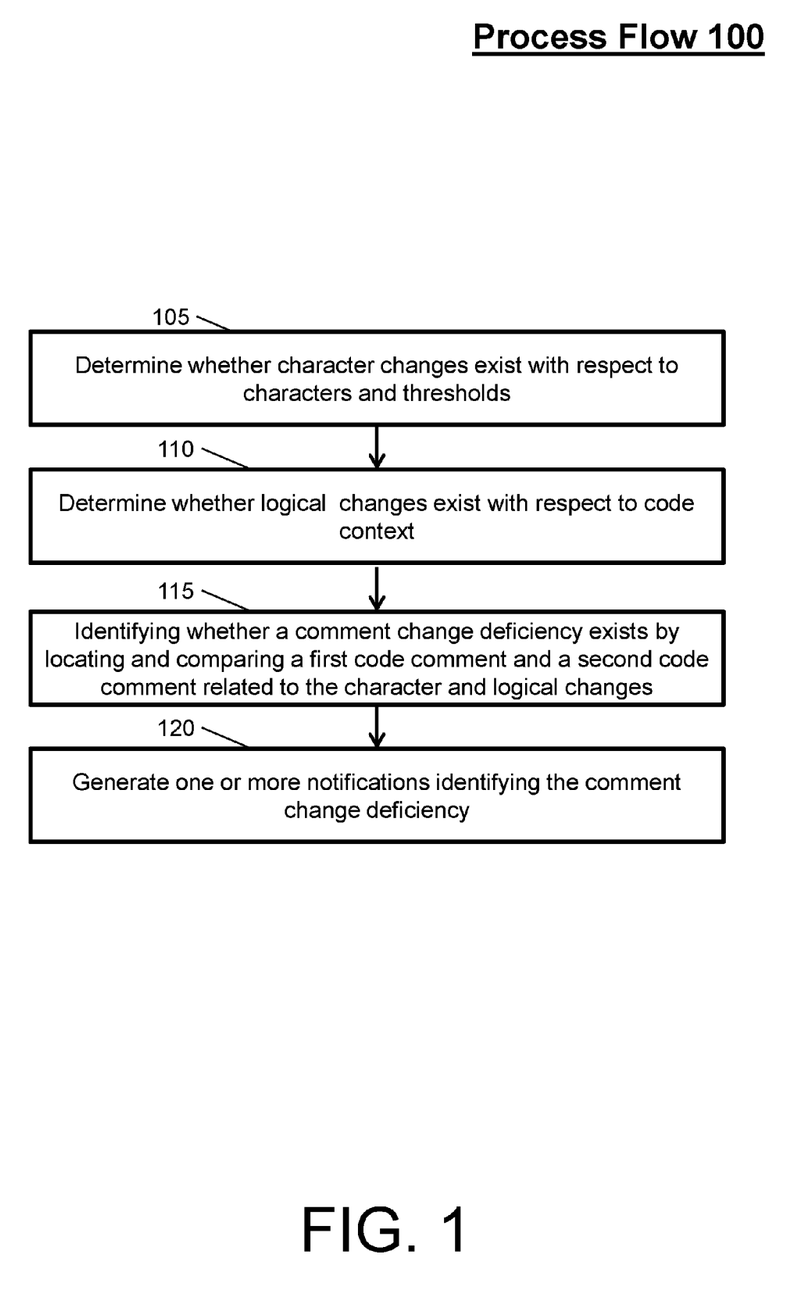
FIG. 1 illustrates a process flow of a smart integrated development environment in accordance with an embodiment.

In view of the above, embodiments disclosed herein may include system, method, and/or computer program product that implements the features of the smart IDE. The features of the smart IDE are described with respect to FIG. 1. FIG. 1 illustrates a process flow 100 of the smart IDE in accordance with an embodiment. The process flow 100, for example, describes a method for automatically identifying a comment change deficiency by a code editing component of the smart IDE executed by a processor.

The process flow 100 begins at block 105, where the smart IDE utilizes the code editing component to determine whether character changes exist with respect to characters and thresholds. Note that one or more character changes can be determined between a first code version and a second code version.

In an embodiment, a character change occurs when a character count of a code line or a code block (e.g., code portion) of a first code version is different from a character count of a code line or a code block (e.g., code portion) of a second code version. A character change can also occur when a character count of a first code version is different from a character count of a second code version. The character change can be detected at the same code location between the first and second code versions (e.g., relative code lines or blocks of the first and second code versions).

A threshold can be a benchmark value predetermined automatically by the smart IDE or defined by a user. In an embodiment, the smart IDE can automatically predetermine a benchmark value by maintaining a log of character counts and determining from the log an average count difference that results in comment changes. For example, if a code block of a first code version has a 100 characters and a threshold is set at a 10% difference, then a character change can be identified with respect to a code block of a second code version if that block has a character count at or less than 90 or a character count at or greater than 110.

Figure 2:
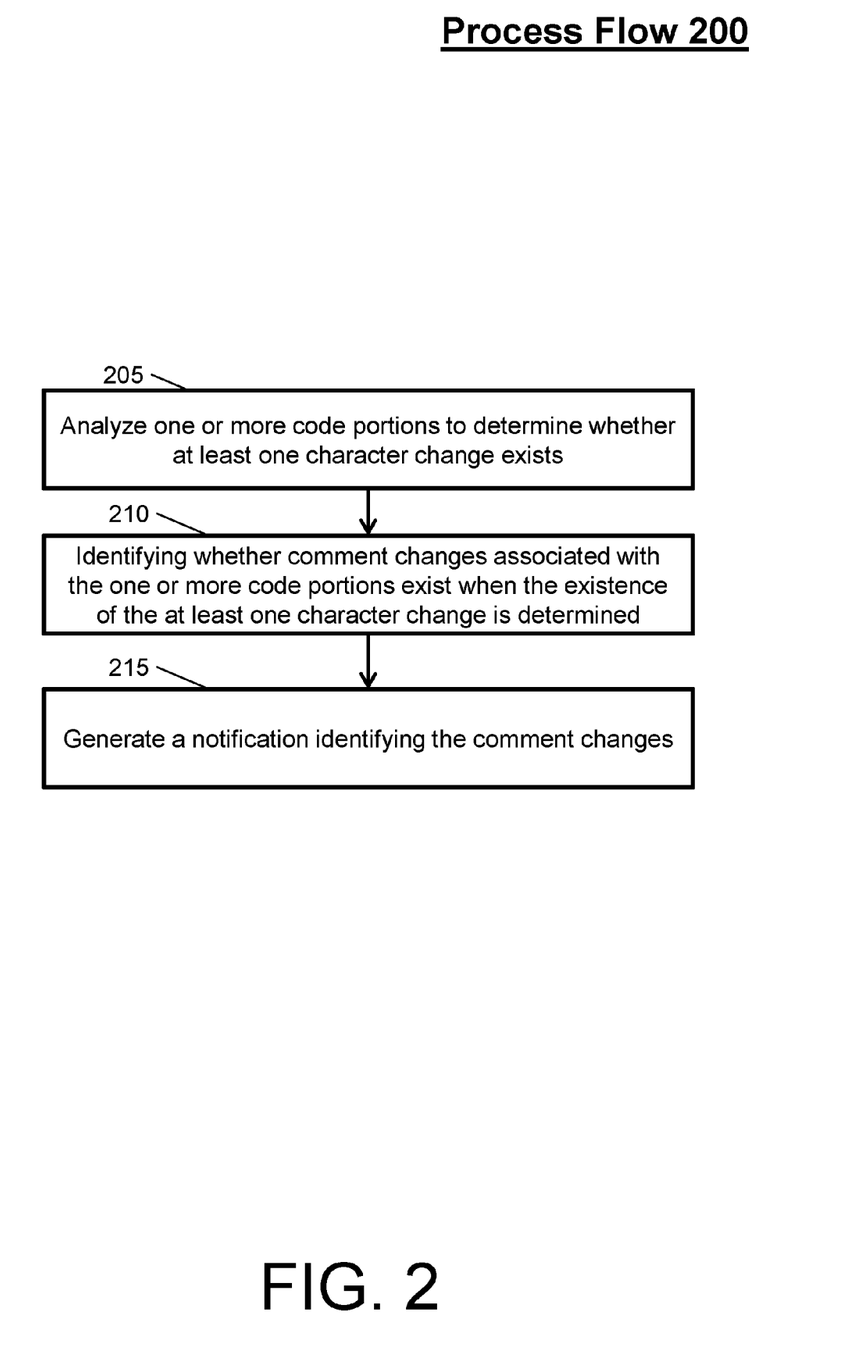
FIG. 2 illustrates a process flow of determining character changes by a smart integrated development environment in accordance with an embodiment.

The character change determination operations of block 105 of FIG. 1 are described with respect to FIG. 2. Turning now to FIG. 2, a process flow 200 of determining character changes by the smart IDE is generally shown in accordance with an embodiment. The process flow 200, for example, describes determining whether one or more character changes exist between a first code version and a second code version by the code editing component of the smart IDE executed by a processor.

The process flow 200 begins at block 205, where the smart IDE utilizes the code editing component to analyze one or more code portions to determine whether at least one character change exists. Note that the analyzing of the one or more code portions can be performed and/or repeatedly performed at one or more different levels of granularity.

In an embodiment, to determine whether a character change exists, the code editing component can identify a character number of a code portion in a first code as a first character count. The code editing component can also identify a character number of a code portion in a second code as a second character count. If the first and second character counts are equal, then there are likely no changes and no further action is needed. If the first and second character counts are not equal, then a character change exists and the process can continue to block 210 (i.e., the smart IDE recognizes the change via a character count).

In another embodiment, the character change can be further analyzed. That is, to determine whether this character change is significant enough to proceed to block 210, the smart IDE can utilize a predetermined threshold to vet the character change. In turn, the code editing component can then compare an absolute value of a difference between the first and second character counts to a predetermined threshold. If the difference is equal to and/or greater than the predetermined threshold, then the character change exists.

Note that, to determine whether a character change exists, the code editing component can analyze code blocks; code lines; code blocks followed by code lines; code lines followed by code block; an entire code version followed by code blocks followed by code lines; etc., so as to iteratively drill into the code to identify character changes.

At block 210, the smart IDE utilizes the code editing component to identify whether comment changes associated with the one or more code portions exist when the existence of the at least one character change is determined. In this regard, comments associated with the one or more code portions from both code versions are located and compared. That is, continuing with the above example operation, if the smart IDE determines that there are some changes in code, then the smart IDE can compare the comments via character counts (e.g., based on threshold another count). If there are no changes in comments or the changes are less than the threshold, then a comment change does not exist and the process can continue to block 215 (i.e., the smart IDE recognizes that the comments need to be updated).

At block 215, the smart IDE utilizes the code editing component to generate a notification identifying the comment changes. That is, the smart IDE can warn users to update the changes. The notification by the code editing component can be a notification that provides at least one comment associated the one or more code portions of a subsequent code version for review. The notification by the code editing component can also be a notification that provides suggestions regarding how to update comments, such as by adding and/or altering comments associated the one or more code portions of a subsequent code version (so that the character changes can be properly identified and described in those comments).

Note that the operations of the code editing component described in block 105 of FIG. 1 and the process flow 200 of FIG. 2 are used to read/compare old and new codes (e.g., word/number characters) to determine if any comments were changed accordingly.

Returning to FIG. 1, the process flow 100 continues at block 110, where the smart IDE utilizes the code editing component to determine whether logical changes exist with respect to code context. Note that one or more logical changes can be determined between a first code version and a second code version.

A logical change can be a change in code context, which is reflected by code grammar or code function (e.g., accounts for special characters and spaces in the code or comments). Thus, to determine whether a logical change exists, the code editing component analyzes the grammar or function to detect the change in the code context. Note that since the change in the code context may alter without increasing or decreasing the number of characters per code portion (e.g., when the smart IDE finds a code change but a character count is same as the previous source code or below the threshold count). For example, if a first code context of a first code version comprises a less-than operation and a second code context of a second code version comprises a greater-than operation, then the code editing component can detect the change in function from less than to greater than despite the character count remaining the same.

Figure 3:
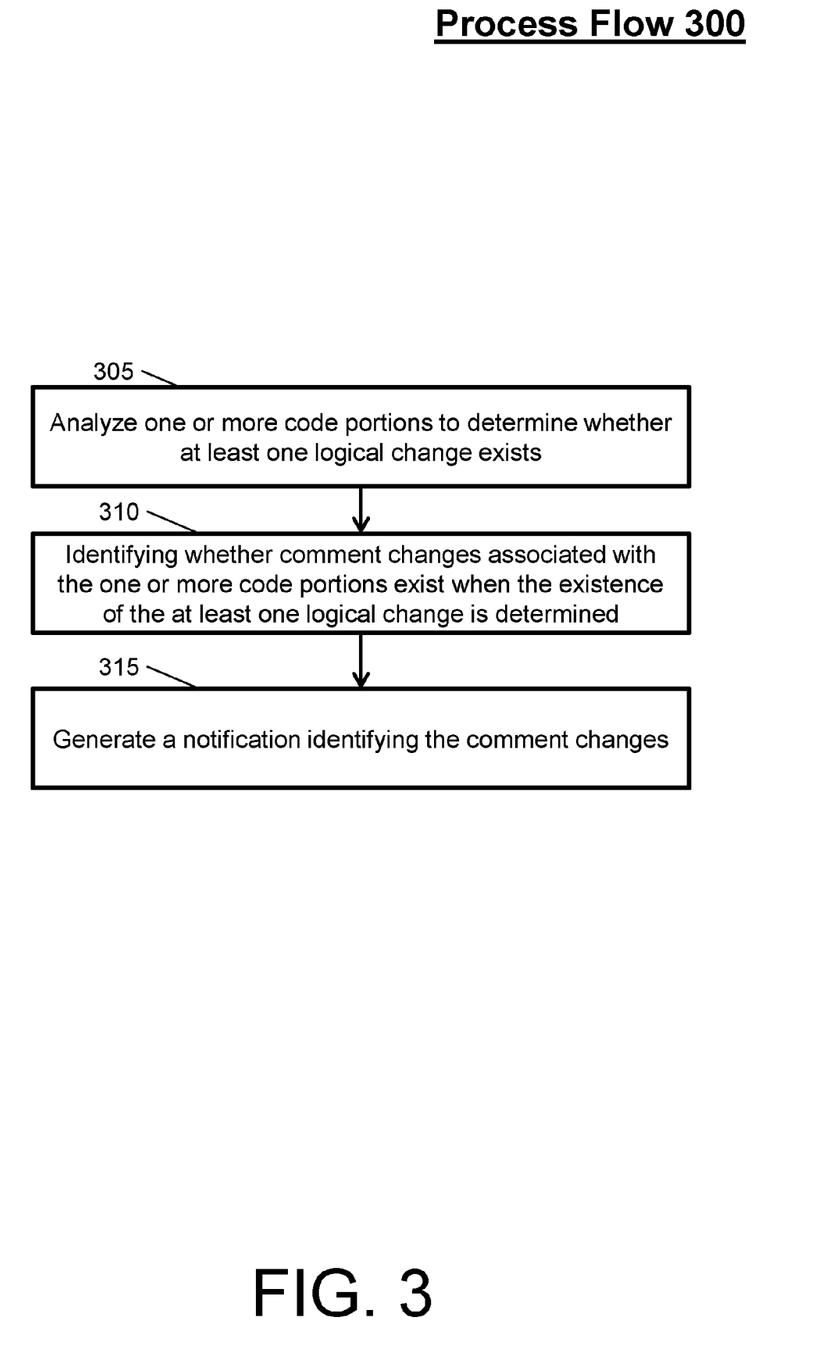
FIG. 3 illustrates a process flow of determining logical changes by a smart integrated development environment in accordance with an embodiment.

The logical change determination operations of block 110 of FIG. 1 are described with respect to FIG. 3. Turning now to FIG. 3, a process flow 300 of determining logical changes by the smart IDE is generally shown in accordance with an embodiment. The process flow 300, for example, describes determining whether one or more logical changes exist between the first code version and the second code version by the code editing component of the smart IDE executed by a processor. Further, the process flow 300 generally relates to determining if there is a code change and no comment change by comparing comments through smart parsing and notifying a user to update comments.

Smart parsing is an operation by the code editing component that determines if there any logical changes in the code and if a comment change is necessary or not. Smart parsing comprises proportionally weighting specials that are added to functions of a code. Proportional weighting includes associating a weight with each special in terms of an expected contraction/modification of the comments, such as a net comment addition or a comment removal. Specials include conditional changes (e.g., operators or variables in if block conditionals) and constant parameter modifications within the code. By smart parsing, the code editing component can learn from the smart IDE what programming language is used to create the code. The code editing component proceeds to analyze the code from the programming language and compare what is being changed logically between versions. The code editing component, by smart parsing, can also parse nearby line/block comments to analyze the code. If the smart parsing operation detects code change, the code editing component can warn a user and suggest comment changes before saving the source file. The smart IDE can also keep previous code files and create a log data automatically to let the user know what comment changes were suggested.

The process flow 300 begins at block 305, where the smart IDE utilizes the code editing component to analyze one or more code portions to determine whether at least one logical change exists. Note that the analyzing of the one or more code portions can be performed and/or repeatedly performed at one or more different levels of granularity.

In an embodiment, to determine whether a logical change exists, the code editing component can identify an operation of a code line in a first code as a first code context. The code editing component can also identify an operation of a code line in a second code as a second code context. The code editing component can then compare the first and second code contexts. If a difference exists between the first and second code contexts, then a logical change exists.

Note that, to determine whether a logical change exists, the code editing component can analyze code blocks; code lines; code blocks followed by code lines; code lines followed by code block; an entire code version followed by code blocks followed by code lines; etc., so as to iteratively drill into the code to identify logical changes At block 310, the smart IDE utilizes the code editing component to identify at least one comment associated with the one or more code portions when the existence of the at least one logical change is determined.

At block 315, the smart IDE utilizes the code editing component to generate a notification identifying the comment changes. The notification by the code editing component can be a notification that provides the at least one comment associated the one or more code portions of a subsequent code version for review. The notification by the code editing component can also be a notification that provides suggestions regarding how to update comments, such as by adding and/or altering comments associated the one or more code portions of a subsequent code version (so that the logical changes can be properly identified and described in those comments).

Returning to FIG. 1, the process flow 100 continues at block 115, where the smart IDE utilizes the code editing component to identifying whether the comment change deficiency exists by locating and comparing a first code comment and a second code comment. The first code comment can relate to the character or the logical changes within the first code version, and the second code comment can relate to the character or the logical changes within the second code version. Note that the comment change deficiency can include the comment change deficiencies identified in one or both of blocks 210 of FIG. 2 and 310 of FIG. 3.

At block 120, the smart IDE utilizes the code editing component to generate one or more notifications identifying the comment change deficiency. Note that the one or more notifications can include notifications generated in one or both of blocks 210 of FIG. 2 and 310 of FIG. 3.

Figure 4:
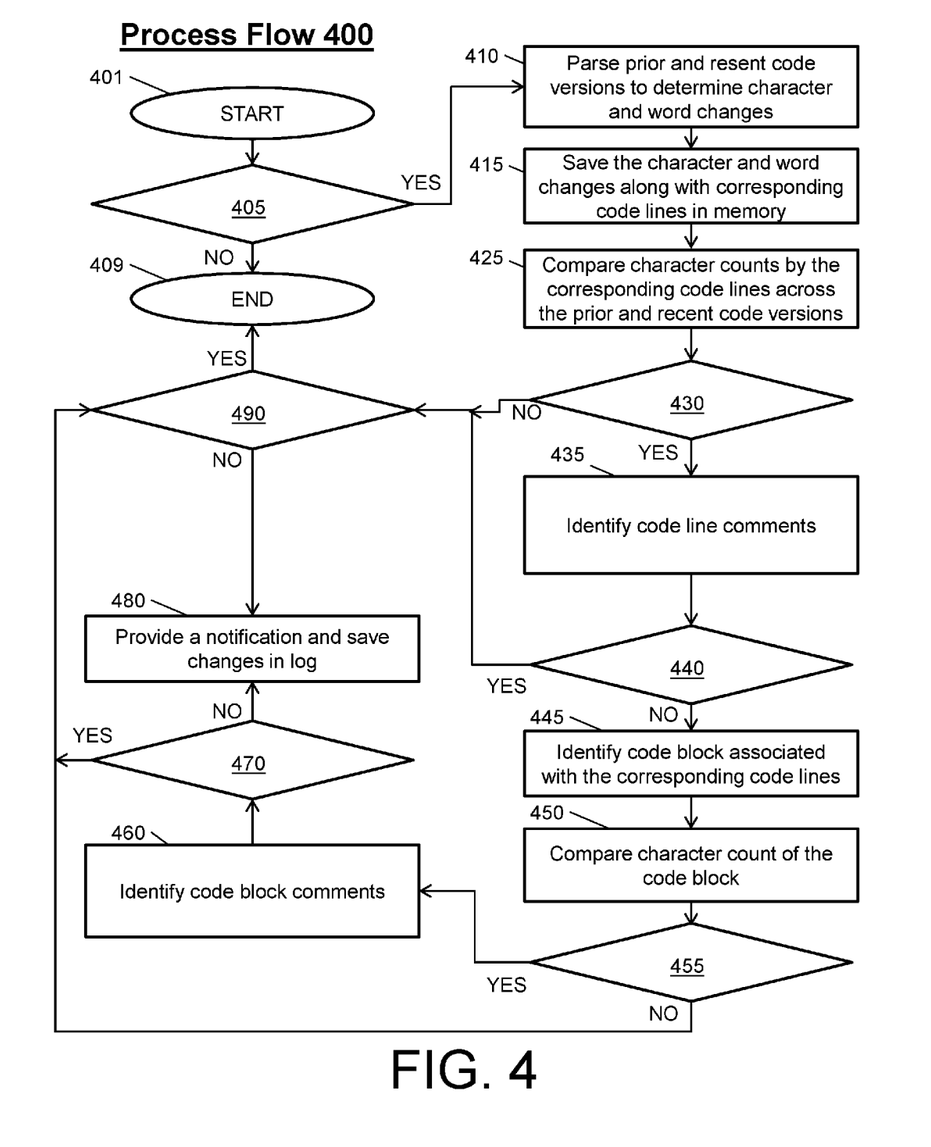
FIG. 4 illustrates a process flow of a smart integrated development environment in accordance with another embodiment.

FIG. 4 illustrates a process flow 400 of the smart IDE in accordance with another embodiment. The process flow 400 begins by proceeding from START circle 401 to decision block 405. At decision block 405, the code editing component determines whether a recent code version managed by the smart IDE has changed over time. For instance, the code editing component can compare save dates of a prior code version to determine if the recent code version has changed with respect to the prior code version. The prior code version and the recent code version can be stored in a memory accessed by the code editing component (e.g., a local memory of a processing system executing the smart IDE). If the recent code version has not changed over time, then the process flow can conclude by proceeding to END circle 409 (as shown by the NO arrow from decision block 405 to END circle 409). If the recent code version has changed over time, then the process flow can proceed to block 410 (as shown by the YES arrow from decision block 405 to block 410).

At block 410, the code editing component can parse the prior and recent code versions to determine character and word changes. The code editing component can parse the prior and recent code versions as text. For example, the code editing component can identify differences between the prior and recent code versions. The code editing component can also identify differences between the comment files associated with the prior and recent code versions. The code editing component can utilize a configuration of the smart IDE to identify these differences, as the smart IDE understands the grammar and syntax of the code versions. All differences can be identified on a code line basis.

At block 415, the code editing component can save the character and word changes along with corresponding code lines in memory. For instance, the character and word changes, the corresponding code lines, and the identified differences can be saved in the local memory of the processing system executing the smart IDE.

At block 425, the code editing component can compare character counts of the corresponding code lines across the prior and recent code versions. At decision block 430, the code editing component determines whether there are any significant code changes between the corresponding code lines across the prior and recent code versions. In this regard, the code editing component can execute a comparison between the character counts of the corresponding code lines and a threshold. If the character counts are equal to and/or greater than the threshold, then significant code line changes exist. If the significant code line changes exist, the process flow can then proceed to block 435 (as shown by the YES arrow from decision block 430 to block 435) to identify code line comments (i.e., comments associated with the corresponding code lines across the prior and recent code versions).

At block 435, the code editing component can identify the code line comments. At decision block 440, the code editing component determines whether any significant code line comment changes exist. In this regard, the code editing component can execute a comparison between the code line comments identified at block 435. For instance, the code editing component executes a comparison between the character counts of the code line comments and a threshold. If the character counts are equal to and/or less than the threshold, then no significant code line comment change exists. When no significant code line comment change exists, the process flow can proceed to block 445 (as shown by the NO arrow from decision block 440 to block 445).

Note that since no significant code line comment change exists, the code editing component has ruled out that the code line comments have been updated appropriately across the prior and recent code versions. In turn, the code editing component can evaluate the code versions on a code block level to determine if code block comments have been updated. Code block comments are comments associated with the code blocks that include the corresponding code lines.

At block 445, the code editing component can identify the code blocks associated with (or that include) the corresponding code lines. The code blocks are identified across the prior and recent code versions. At block 450, the code editing component can compare character count of the code blocks. At decision block 455, the code editing component determines whether there are any significant code changes between the code blocks. The code editing component can execute a comparison between the character counts of the code blocks and a threshold. If the character counts are equal to and/or greater than the threshold, then significant code block changes exist. If the significant code block changes exist, the process flow can then proceed to block 460 (as shown by the YES arrow from decision block 455 to block 460) to identify the code block comments.

At decision block 470, the code editing component determines whether any significant code block comment changes exist. In this regard, the code editing component can execute a comparison between the code block comments identified at block 460. For instance, the code editing component executes a comparison between the character counts of the code block comments and a threshold. If the character counts are equal to and/or less than the threshold, then no significant code block comment change exists. When no significant code block comment change exists, the process flow can proceed to block 480 (as shown by the NO arrow from decision block 440 to block 445).

Note that since no significant code line comment change exists (see block 440) and since no significant code line comment change exists (see block 470), the code editing component has ruled out that any comments of the recent code version have been updated appropriately. In turn, at block 480, the code editing component can provide a notification and save changes in the log. The notification can be provided to a user and indicate that the comments did not track changes between the prior and recent code versions.

Returning to decision block 440, it is noted that when the character counts are greater than the threshold for the code line comments, then the code line comments have been changed between the prior and recent code versions. Yet, a comparison still needs to be made to make sure these changes to the code line comments appropriately identify the corresponding code line changes. In this way, the process flow 400 can proceed to decision block 490 (as shown by the YES arrow from decision block 440 to block 490), where the code editing component can perform a smart parsing. At block 490, the smart parsing can identify whether the code line comments appropriately identify the corresponding code changes based on code context. If the corresponding code changes have not been identified by the code line comments, then the process flow can proceed to block 480 (as shown by the NO arrow from decision block 490 to block 480). Otherwise, the process ends (as shown by the YES arrow from decision block 490 to END circle 409).

Similarly, with block 470, when the character counts are greater than the threshold for the code block comments, then the code block comments have been changed between the prior and recent code versions and a comparison is needed to make sure these changes to the code block comments appropriately identify the corresponding code block changes. In this way, the process flow 400 can proceed to decision block 490 (as shown by the YES arrow from decision block 440 to block 490), where the code editing component can perform a smart parsing. At block 490, the smart parsing can identify whether the code block comments appropriately identify the corresponding code changes based on code context. If the corresponding code changes have not been identified by the code block comments, then the process flow can proceed to block 480 (as shown by the NO arrow from decision block 490 to block 480). Otherwise, the process ends (as shown by the YES arrow from decision block 490 to END circle 409).

Returning to decision blocks 430 and 455, the process flow 400 can also proceed to decision block 490 if the following occurs: if at block 430 the character counts are less than the threshold, then significant code block changes do not exist; or if at block 450 the character counts are less than the threshold, then significant code block changes does not exist. In either case, the smart parsing can identify whether the comments identify code changes based on code context.

In another embodiment, an IDE warning (e.g., a notification) can be executed for code change when a code is without appropriate code comment adjustments commensurate with a level of code editing. For instance, from a position where the edits took place, the smart IDE can nest up to a nearest comment block using backwards scoping (e.g., locating to a nearest comment block as the at least one comment using a backwards scoping operation through the first code version or the second code version), can set a threshold based on characters changed in the scope affected vs characters in a nearest (innermost) commenting, and then warn a user that the nearest comment block might need to be updated if more characters were changed (deletions/additions) than the threshold.

Figure 5:
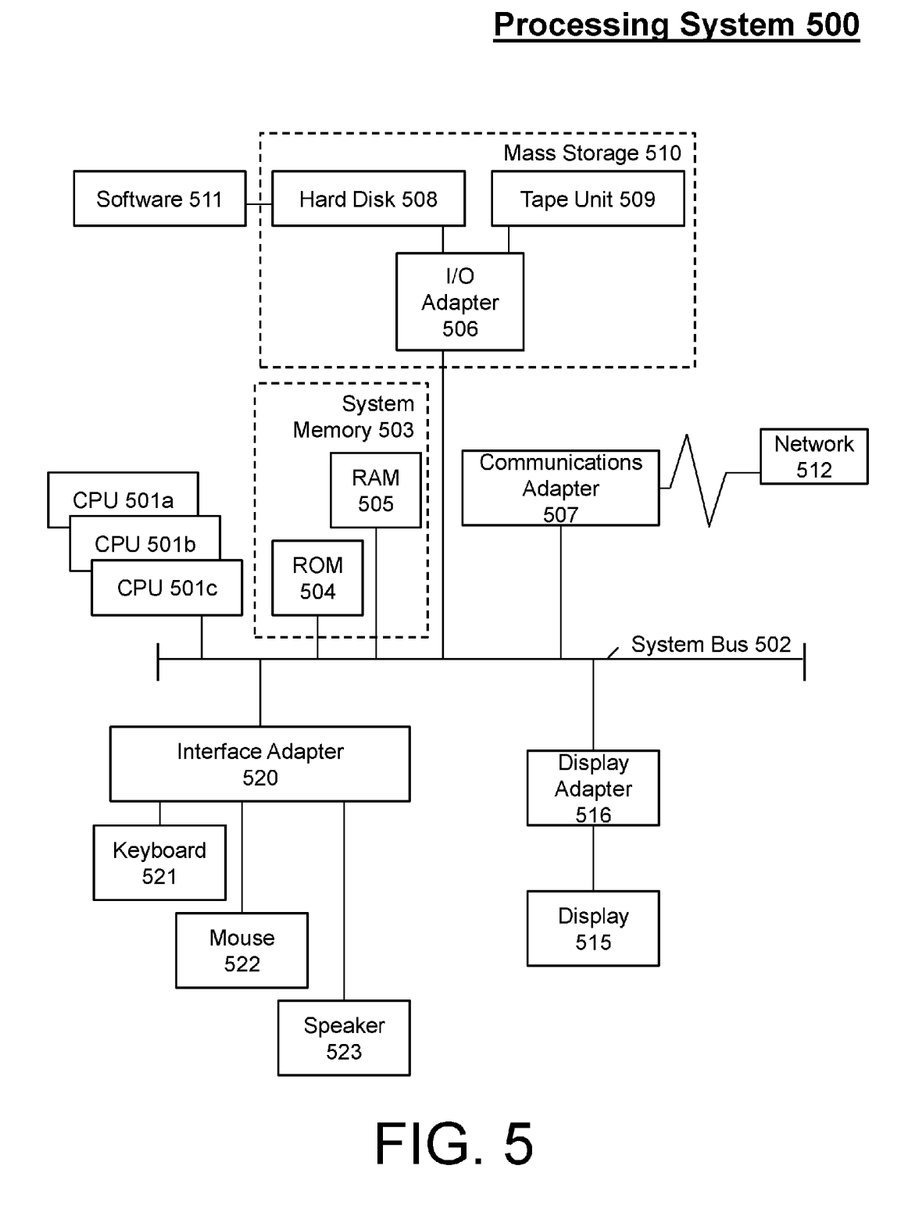
FIG. 5 illustrates a processing system in accordance with an embodiment.

Referring now to FIG. 5, there is shown an embodiment of a processing system 500 for implementing the teachings herein. In this embodiment, the processing system 500 has one or more central processing units (CPU(s)) 501a, 501b, 501c, etc. (collectively or generically referred to as processor(s) 501). The processors 501, also referred to as processing circuits, are coupled via a system bus 502 to system memory 503 and various other components. The system memory 503 can include a read only memory (ROM) 504 and a random access memory (RAM) 505. The ROM 504 is coupled to system bus 502 and may include a basic input/output system (BIOS), which controls certain basic functions of the processing system 500. The RAM is read-write memory coupled to the system bus 502 for use by the processors 501.

FIG. 5 further depicts an input/output (I/O) adapter 506 and a communications adapter 507 coupled to the system bus 502. The I/O adapter 506 may be a small computer system interface (SCSI) adapter that communicates with a hard disk 508 and/or tape unit (tape storage drive) 509 or any other similar component. The I/O adapter 506, the hard disk 508, and the tape unit 509 are collectively referred to herein as a mass storage 510. A software 511 for execution on the processing system 500 may be stored in the mass storage 510. The mass storage 510 is an example of a tangible storage medium readable by the processors 501, where the software 511 is stored as instructions for execution by the processors 501 to perform a method, such as the process flows of FIGS. 1-4. A communications adapter 507 interconnects the system bus 502 with a network 512, which may be an outside network, enabling the processing system 500 to communicate with other such systems. A display (e.g., screen, a display monitor) 515 is connected to the system bus 502 by a display adapter 516, which may include a graphics controller to improve the performance of graphics intensive applications and a video controller. In one embodiment, the adapters 506, 507, and 516 may be connected to one or more I/O buses that are connected to the system bus 502 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to the system bus 502 via an interface adapter 520 and the display adapter 516. A keyboard 521, a mouse 522, and a speaker 523 can be interconnected to the system bus 502 via the interface adapter 520, which may include, for example, a Super I/O chip integrating multiple device adapters into a single integrated circuit.

Thus, as configured in FIG. 5, the processing system 500 includes processing capability in the form of the processors 501, and, storage capability including the system memory 503 and the mass storage 510, input means such as the keyboard 521 and the mouse 522, and output capability including the speaker 523 and the display 515. In one embodiment, a portion of the system memory 503 and the mass storage 510 collectively store an operating system, such as the z/OS or AIX operating system from IBM Corporation, to coordinate the functions of the various components shown in FIG. 5.

Technical effects and benefits of the smart IDE comprise automatically identifying comments and comment changes that would otherwise be lost as software execution switches between code versions. Note that the smart IDE performs the automatic identification on such a granular level (e.g., by code line or code block) that users can receive benefits of seeing comment changes and/or getting suggestions regarding how to update comments. Thus, embodiments described herein are necessarily rooted in the smart IDE execute by a processing system to perform proactive operations to overcome problems specifically arising in the realm of code editing.

Embodiments may include a system, a method, and/or a computer program product at any possible technical detail level of integration. The computer program product may include a computer readable storage medium (or media) having computer readable program instructions thereon for causing a processor to carry out aspects of the embodiments herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments herein may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments herein.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments herein. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of automatically identifying a comment change deficiency by a code editing component executed by a processor, the method comprising:

determining, automatically by the processor, whether one or more character changes exist between a first code version and a second code version,
wherein the one or more character changes comprise when a character count at a first location of the first code version is different than a character count at a second location of the second code version by a threshold difference, the first and second locations being within the first and second code versions,
wherein the first location of the first code version indicates a same line or block of code corresponding to the second location of the second code version and the first and second locations are not the first or last line or block of code in the first or second code versions;
determining, automatically by the processor, whether one or more logical changes exist between the first code version and the second code version;
identifying, automatically by the processor, whether the comment change deficiency exists by locating and comparing a first character count of a first code comment and a second character count of a second code comment,
wherein the first and second code comments relate to the characters or logical changes within the respective first and second code versions;
generating, automatically by the processor, one or more notifications identifying the comment change deficiency when the difference of the first character count and the second character count is less than a second threshold,
wherein the code editing component comprises a plug-in of an integrated development environment managing the first code version and the second code version,
wherein the one or more logical changes comprise:
a change in code context from the first code version to the second code version, wherein 1) the change in code context is based on the one or more character changes existing and 2) the one or more character changes (i) take into account special characters and spaces and (ii) cause a change to code grammar;
generating, automatically by the processor, one or more suggestions regarding the comment change deficiency; and
transmitting, automatically by the processor, the generated one or more notifications and suggestions to the integrated development environment.

2. The method of claim 1, wherein the determining of whether the one or more character changes exist comprises: repeatedly analyzing the first code version and the second code version at increasing levels of granularity for the one or more character changes.

3. The method of claim 2, wherein a first level of the levels of granularity is a code block, and wherein a second level of the levels of granularity is a code line.

4. The method of claim 1, wherein the threshold difference is a set at a 10%.

5. A computer program product, the computer program product comprising a non-transitory computer readable storage medium having program instructions for automatically identifying a comment change deficiency embodied therewith, the program instructions executable as a code editing component and by a processor to cause the processor to perform:

determining, automatically, whether one or more character changes exist between a first code version and a second code version, wherein the one or more character changes comprise when a character count at a first location of the first code version is different than a character count at a second location of the second code version by a threshold difference, the first and second locations being within the first and second code versions, wherein the first location of the first code version indicates a same line or block of code corresponding to the second location of the second code version and the first and second locations are not the first or last line or block of code in the first or second code versions;

determining, automatically, whether one or more logical changes exist between the first code version and the second code version;

identifying, automatically, whether the comment change deficiency exists by locating and comparing a first character count of a first code comment and a second character count of a second code comment, wherein the first and second code comments relate to the characters or logical changes within the respective first and second code versions;

generating, automatically, one or more notifications identifying the comment change deficiency when the difference of the first character count and the second character count is less than a second threshold, wherein the code editing component comprises a plug-in of an integrated development environment managing the first code version and the second code version, wherein the one or more logical changes comprise:
a change in code context from the first code version to the second code version, wherein 1) the change in code context is based on the one or more character changes existing and 2) the one or more character changes (i) take into account special characters and spaces and (ii) cause a change to code grammar;

generating, automatically by the processor, one or more suggestions regarding the comment change deficiency; and transmitting, automatically by the processor, the generated one or more notifications and suggestions to the integrated development environment.

6. The computer program product of claim 5, wherein the determining of whether the one or more character changes exist comprises: repeatedly analyzing the first code version and the second code version at increasing levels of granularity for the one or more character changes.

7. The computer program product of claim 6, wherein a first level of the levels of granularity is a code block, and wherein a second level of the levels of granularity is a code line.

8. A system, comprising a processor and a memory storing program instructions for automatically identifying a comment change deficiency thereon, the program instructions executable as a code editing component by a processor to cause the system to perform:

determining, automatically, whether one or more character changes exist between a first code version and a second code version, wherein the one or more character changes comprise when a character count at a first location of the first code version is different than a character count at a second location of the second code version by a threshold difference, the first and second locations being within the first and second code versions, wherein the first location of the first code version indicates a same line or block of code corresponding to the second location of the second code version and the first and second locations are not the first or last line or block of code in the first or second code versions;

determining, automatically, whether one or more logical changes exist between the first code version and the second code version;

identifying, automatically, whether the comment change deficiency exists by locating and comparing a first character count of a first code comment and a second character count of a second code comment, wherein the first and second code comments relate to the characters or logical changes within the respective first and second code versions;

generating, automatically, one or more notifications identifying the comment change deficiency when the difference of the first character count and the second character count is less than a second threshold, wherein the code editing component comprises a plug-in of an integrated development environment managing the first code version and the second code version, wherein the one or more logical changes comprise:
a change in code context from the first code version to the second code version, wherein 1) the change in code context is based on the one or more character changes existing and 2) the one or more character changes (i) take into account special characters and spaces and (ii) cause a change to code grammar;

generating, automatically by the processor, one or more suggestions regarding the comment change deficiency; and transmitting, automatically by the processor, the generated one or more notifications and suggestions to the integrated development environment.

9. The system of claim 8, wherein the determining of whether the one or more character changes exist comprises: repeatedly analyzing the first code version and the second code version at increasing levels of granularity for the one or more character changes.

10. The system of claim 9, wherein a first level of the levels of granularity is a code block, and wherein a second level of the levels of granularity is a code line.

* * * * *